(12) United States Patent
Tadanaga et al.

(10) Patent No.: US 11,644,735 B2
(45) Date of Patent: May 9, 2023

(54) WAVELENGTH CONVERSION ELEMENT

(71) Applicant: Nippon Telegraph and Telephone Corporation, Tokyo (JP)

(72) Inventors: Osamu Tadanaga, Musashino (JP); Takahiro Kashiwazaki, Musashino (JP); Takushi Kazama, Musashino (JP); Takeshi Umeki, Musashino (JP); Koji Embutsu, Musashino (JP); Nobutatsu Koshobu, Musashino (JP); Ryoichi Kasahara, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/614,653

(22) PCT Filed: May 30, 2019

(86) PCT No.: PCT/JP2019/021606
§ 371 (c)(1),
(2) Date: Nov. 29, 2021

(87) PCT Pub. No.: WO2020/240793
PCT Pub. Date: Dec. 3, 2020

(65) Prior Publication Data
US 2022/0221770 A1    Jul. 14, 2022

(51) Int. Cl.
*G02F 1/35* (2006.01)
*G02F 1/355* (2006.01)
*G02F 1/377* (2006.01)

(52) U.S. Cl.
CPC .......... *G02F 1/3548* (2021.01); *G02F 1/3551* (2013.01); *G02F 1/377* (2013.01)

(58) Field of Classification Search
CPC ....... G02F 1/3548; G02F 1/3551; G02F 1/377
See application file for complete search history.

(56) References Cited

U.S. PATENT DOCUMENTS

| | | | |
|---|---|---|---|
| 2010/0033806 A1* | 2/2010 | Satoh | G02F 1/3558 117/1 |
| 2013/0010351 A1* | 1/2013 | Vermeulen | G02F 1/3544 359/345 |

FOREIGN PATENT DOCUMENTS

EP    3751339 A1 * 12/2020 ........... G02F 1/3551

OTHER PUBLICATIONS

Y. Nishida et al., *Direct-Bonded QPM-LN Ridge Waveguide with High Damage Resistance at Room Temperature*, Electronics Letters, vol. 39, No. 7, 2003, pp. 609-611.

(Continued)

*Primary Examiner* — Daniel Petkovsek
(74) *Attorney, Agent, or Firm* — Workman Nydegger

(57) ABSTRACT

Provided is a wavelength conversion element capable of achieving highly efficient wavelength conversion, without relying on a method of applying electric fields. A wavelength conversion element is formed of a second-order nonlinear optical crystal and has a z-axis, running along a direction of spontaneous polarization, within a substrate plane. The wavelength conversion element includes a waveguide in which, when a plurality of circles having their centers on a straight line parallel to the z-axis and having the same radius are depicted so that circumferences of the plurality of circles contact each other, semicircular waveguides corresponding to one semicircles of the circumferences with the straight line as a boundary, are alternately connected.

4 Claims, 11 Drawing Sheets

(56) References Cited

OTHER PUBLICATIONS

Takeshi Umeki et al., *Highly Efficient Wavelength Converter Using Direct-Bonded PPZnLN Ridge Waveguide*, IEEE Journal of Quantum Electronics, vol. 46, No. 8, 2010, pp. 1206-1213.

K. Mizuuchi et al., *Harmonic Blue Light Generation In X-Cut MgO:LiNbO3 Waveguide*, Electronics Letters, vol. 33, No. 9, 1997, pp. 806-807.

Cheng Wang et al, *Ultrahigh-Efficiency Wavelength Conversion in Nanophotonic Periodically Poled Lithium Niobate Waveguides*, Optica, vol. 5, No. 11, 2018, pp. 1438-1441.

* cited by examiner

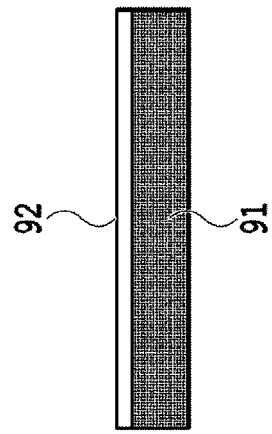
Fig. 11(c)
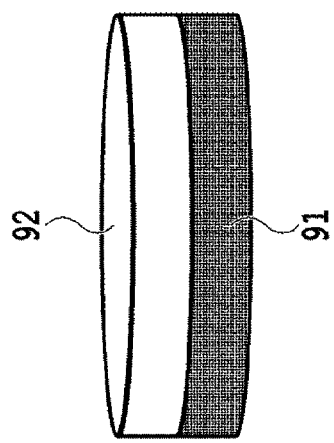
Fig. 11(b)
Fig. 11(e)
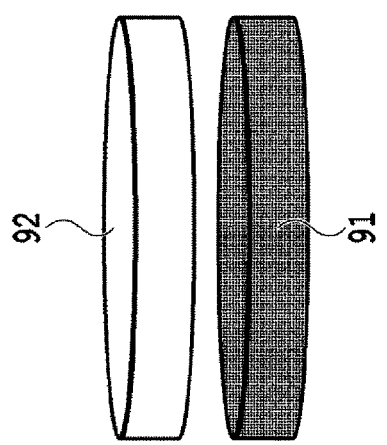
Fig. 11(a)
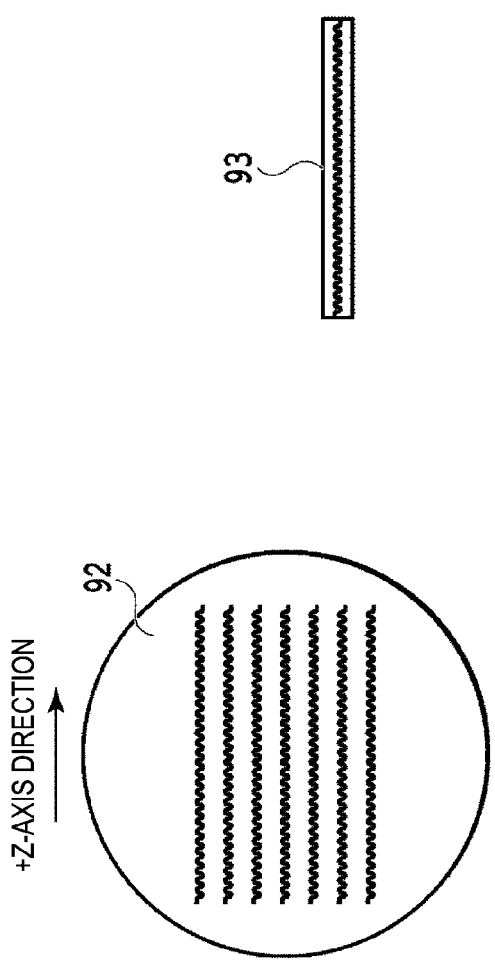
Fig. 11(d)

WAVELENGTH CONVERSION ELEMENT

The present invention relates to a wavelength conversion element, specifically relates to an optical element using a nonlinear optical effect, and relates also to a wavelength conversion element employed in an optical communication system, an optical measurement system, and the like.

BACKGROUND ART

In addition to optical signal wavelength conversion in optical communication, a wavelength conversion technology is applied to optical processing, medical applications, biotechnology, and the like. The wavelength conversion technology is utilized in light sources outputting light in a wavelength range that cannot be directly output by a semiconductor laser in a range from an ultraviolet range to a visible light range, an infrared light range, and a terahertz range, and in light sources requiring high output intensities that cannot be obtained by a semiconductor laser even in a wavelength range that can be directly output by the semiconductor laser. In particular, a wavelength conversion element including a periodic polarization inversion optical waveguide employing lithium niobate ($LiNbO_3$:LN) that is a second-order nonlinear material and has a large nonlinear constant, is already used in commercially available light sources because such a wavelength conversion element has high efficiency.

In a second-order nonlinear optical effect, light having wavelengths $\lambda_1$ and $\lambda_2$ is input to generate light having a new wavelength $\lambda_3$.

Wavelength conversion that satisfies $$1/\lambda_3 = 1/\lambda_1 + 1/\lambda_2 \tag{1}$$

is referred to as sum frequency generation (SFG). If Equation 1 is transformed by $\lambda_1=\lambda_2$, wavelength conversion that satisfies $$\lambda_3 = \lambda_1/2 \tag{2}$$

is referred to as second harmonic generation (SHG). Furthermore, wavelength conversion that satisfies $$1/\lambda_3 = 1/\lambda_1 - 1/\lambda_2 \tag{3}$$

is referred to as difference frequency generation (DFG). Here, there is an optical parametric effect in which only $\lambda_1$ is input and $\lambda_2$ and $\lambda_3$ are generated to satisfy Equation (3). In particular, SHG and SFG newly generate, from input light, light having a short wavelength, that is, light having high energy, and are often utilized for generating light in a visible light range, for example.

In order to efficiently make the second-order nonlinear optical effects of SHG and SFG, it is required that a phase mismatch amount of three interacting wavelengths is zero. For this purpose, there is a method of achieving the phase mismatch amount of zero by angle matching methods utilizing a difference in refractive indices resulting from the polarization direction of a nonlinear optical crystal to appropriately set an incident angle of light incident on the nonlinear optical crystal. However, the angle matching method has a problem that a maximum nonlinear constant of the nonlinear optical crystal cannot be utilized.

On the other hand, an example of a method in which input light polarized in a direction including the maximum nonlinear constant can be utilized includes a method of incorporating a periodic polarization inversion structure. That is, it is possible to achieve a quasi-phase mismatch amount of zero by periodically inverting the polarization of a second-order nonlinear optical material. When this inversion period is $\Lambda$, it is only required to set $\Lambda$ so to satisfy $$n_3/\lambda_3 - n_2/\lambda_2 - n_1/\lambda_1 - 1/\Lambda = 0 \tag{4}$$

for the wavelengths $\lambda_1$, $\lambda_2$, and $\lambda_3$ in the sum frequency generation represented in Equation (1). Here. $n_3$ is the refractive index at the wavelength $\lambda_3$, $n_2$ is the refractive index at the wavelength $\lambda_2$, and $n_1$ is the refractive index at the wavelength $\lambda_1$.

Such a periodic polarization inversion structure is provided and the structure is further formed into an optical waveguide so that light is confined at a high density in a narrow area and propagated over a long distance, and thus, highly efficient wavelength conversion has been realized. For example, as described in NPL 1, it is possible to utilize bulk properties of a crystal as they are, and thus, ridge-type optical waveguides with characteristics including high photo-damage resistance, long-term reliability, and ease of device design have been researched and developed. For example, a first substrate having a part previously formed with a periodic polarization inversion structure in which a phase matching condition is satisfied in a predetermined wavelength band, and a second substrate holding the first substrate are bonded with the z-axis as a slope. The first substrate is formed into a thin film and processed to form a ridge so that a wavelength conversion element that is a ridge-type optical waveguide is manufactured. When two substrates are to be bonded, direct bonding techniques are known as techniques for firmly bonding substrates, without using an adhesive or the like.

In NPL 1, a waveguide is formed by using a dicing saw in order to confine light in the lateral direction of the waveguide. However, in recent years, a waveguide forming method using a dry etching method as described in NPL 2 may be applied.

In the wavelength conversion elements described in NPLs 1 and 2, incident light and converted light to be guided convert the wavelength of TM-polarized light in which an optical electric field is biased in a direction perpendicular to a substrate.

Furthermore, as described in NPL 3, a wavelength conversion element having a polarization inversion structure in which the z-axis is substantially parallel in the substrate plane has been also proposed. In this wavelength conversion element, a positive comb-shaped electrode is formed on a top surface of a substrate, and negative electrodes are formed on the top surface of the substrate and a bottom surface of the substrate to each apply voltage values different from each other. As a result, a rod-shaped polarization inversion structure reflecting a projected shape of the comb-shaped electrode along the z-axis substantially parallel to the substrate surface is manufactured.

Furthermore, as described in NPL 4, a wavelength conversion element formed with a polarization inversion structure having a z-axis in a plane of a substrate has been demonstrated. In this wavelength conversion element, lithium niobate, being a second-order nonlinear material, is very thin and strongly confines light to exhibit a very high conversion efficiency. When the z-axis is in a direction parallel to or substantially parallel to the substrate surface, incident light and converted light to be guided convert the wavelength of TE-polarized light in an in-plane direction of the substrate.

A known process of manufacturing polarization inversion structures includes a step of inverting the polarization of a substrate by applying an electric field in order to utilize a large nonlinear constant. This manufacturing process requires a step of producing a comb-shaped electrode, a step of applying an electric field, and a step of peeling an electrode. Furthermore, in the step of applying the electric field, it is necessary to apply an electric field exceeding a coercive electric field of the nonlinear optical crystal, and thus, there is a problem in that a large voltage source of a kV order is required and an extremely complicated process is needed.

CITATION LIST

Non Patent Literature

NPL 1: Y. Nishida, H. Miyazawa, M. Asobe, O. Tadanaga, and H. Suzuki, "Direct-bonded QPM-LN Ridge Waveguide with High damage Resistance at Room Temperature", Electronics Letters, Vol. 39, No. 7, p. 609-611, 2003.

NPL 2: T. Umeki, O. Tadanaga, and M. Asobe, "Highly Efficient Wavelength Converter Using Direct-Bonded PPZnLN Ridge Waveguide", IEEE Journal of Quantum Electronics, Vol. 46, No. 8, pp. 1206-1213, 2010.

NPL 3: K. Mizuuchi, K. Yamamoto, and M. Kato, "Harmonic Blue Light Generation in X-cut MgO:LiNbO3 Waveguide", Electronics Letters, Vol. 33, No. 9, pp. 806-807, 1997.

NPL 4: C. Wang, C. Langrock, A. Marandi, M. Jankowski, M. Zhang, B. Desiatov, M. M. Fejer, and M. Loncar, "Ultrahigh-efficiency Wavelength Conversion in Nanophotonic Periodically Poled Lithium Niobate Waveguides", Optica, Vol. 5, No. 11, pp. 1438-1441, 2018.

SUMMARY OF THE INVENTION

An object of the present invention is to provide a wavelength conversion element capable of achieving highly efficient wavelength conversion without employing a method of applying electric fields.

In order to achieve such an object, one embodiment of the present invention is a wavelength conversion element formed of a second-order nonlinear optical crystal and having a z-axis, running along a direction of spontaneous polarization, within a substrate plane, and the wavelength conversion element is characterized in including a waveguide in which, when a plurality of circles having centers on a straight line parallel to the z-axis and having an identical radius are depicted so that circumferences of the plurality of circles contact each other, semicircular waveguides corresponding to one semicircle of the circumferences with the straight line as a boundary, are alternately connected.

According to this configuration, an angle at which incident light is guided with respect to the z-axis, running along the direction of spontaneous polarization of the second-order nonlinear optical crystal, changes continuously, and thus, the magnitude of the nonlinear constant $d_{33}$ experienced by the light changes periodically, and if the light successively propagates in the semicircular waveguides, the light propagates in a first-order periodic polarization inversion structure. This makes quasi-phase matching possible and highly efficient wavelength conversion can be realized.

BRIEF DESCRIPTION OF DRAWINGS

FIGS. 11(a)-11(e) are diagrams illustrating a method of manufacturing the wavelength conversion element according to the present embodiment.

DESCRIPTION OF EMBODIMENTS

Hereinafter, embodiments of the present disclosure will be described in detail with reference to the drawings.

Figure 1:
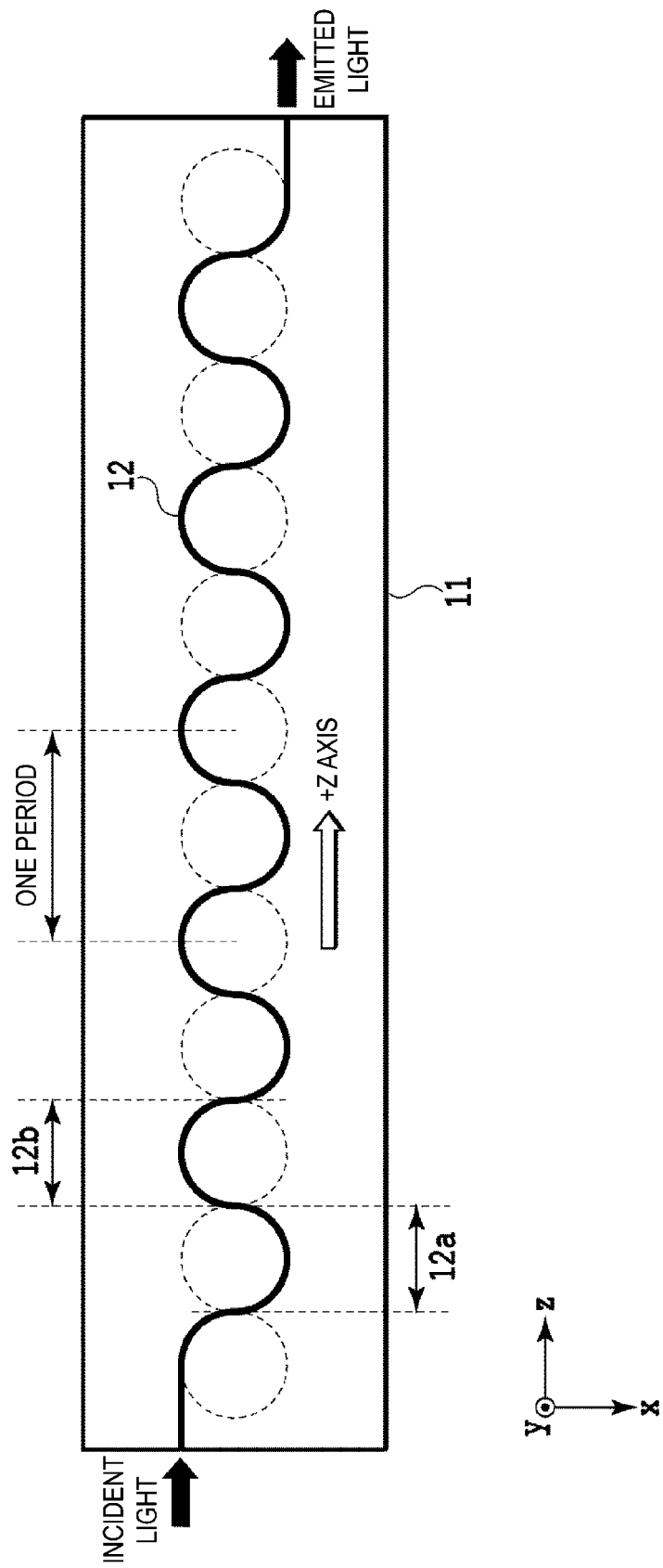
FIG. 1 is a diagram illustrating a waveguide structure of a wavelength conversion element according to an embodiment of the present invention.

FIG. 1 illustrates a waveguide structure of a wavelength conversion element according to an embodiment of the present invention. FIG. 1 illustrates a waveguide 12 formed in a nonlinear optical crystal substrate 11 of the wavelength conversion element. LN being the nonlinear optical crystal is a uniaxial crystal, and the z-axis running along a direction of spontaneous polarization, is referred to as an optical axis. In the LN, a nonlinear constant $d_{33}$ is at a maximum, when light having an electric field in the z-axis is incident, the light experiences the largest nonlinear constant for abnormal light (the polarization direction of which is the z-axis direction). As illustrated in FIG. 1, the z-axis is placed parallel to a substrate surface of the nonlinear optical crystal substrate 11 in a longitudinal direction.

The waveguide 12 is arranged to emit, in the +z direction, incident light incident in the +z direction. In a shape of the waveguide 12, when a plurality of circles having their centers on a straight line parallel to the z-axis and having the same radius r are depicted so that the circumferences of the plurality of circles contact each other, semicircular waveguides 12a and 12b each corresponding to one semicircle of the circumferences with the straight line as a boundary, are alternately connected. As a whole, a structure in which light propagates in the same direction as the +z direction of spontaneous polarization is obtained. For simplicity, only a small number of semicircular waveguides are depicted, but in practical use, hundreds or thousands of semicircular waveguides may be connected as needed.

Figure 2:
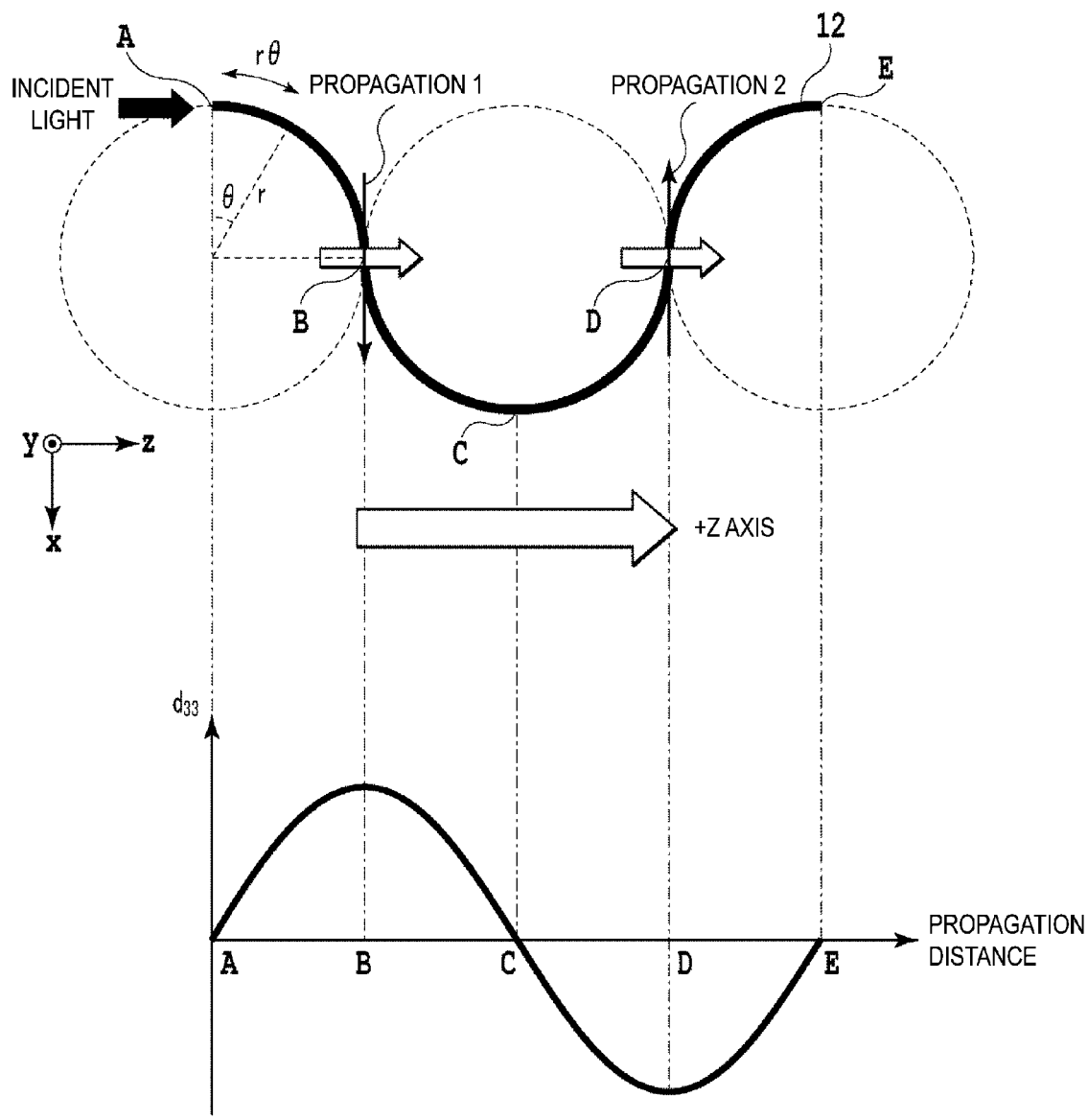
FIG. 2 is a diagram illustrating details of the waveguide structure of the wavelength conversion element.

FIG. 2 illustrates details of the waveguide structure of the wavelength conversion element. FIG. 2 illustrates one period of the waveguide structure illustrated in FIG. 1. When incident light propagates from the left in the drawing, a propagation distance of the incident light is rθ if the incident light travels by an angle θ where the radius of the circle is r. FIG. 2 also shows the magnitude of the nonlinear constant $d_{33}$ experienced by TE-polarized light (the polarization plane of which is the xz-plane) with the propagation distance represented on the horizontal axis when the TE-polarized light is propagated in the waveguide. FIG. 2 shows a relationship between $d_{33}$ and the propagation distance corresponding to each of points A, B, C, D, and E in the waveguide 12.

At the points A, C, and E, the electric field of light oscillates in a direction perpendicular to a direction in which the polarization is directed, and nonlinearity is not exhibited. At the point B, the polarization direction is from right to left with respect to the traveling direction of the light (x-axis direction), and at the point D, the polarization direction is from left to right with respect to the traveling direction of the light, and thus, at the points B and D, the polarization direction is opposite to the traveling direction of the light (-x-axis direction). The propagated light is TE-polarized light, and thus, the oscillation direction of the electric field of the light and the orientation of the polarization are parallel at the points B and D, and the nonlinear constant $d_{33}$ experienced by the light is large.

That is, an angle formed by the direction of a guided wave and the orientation of spontaneous polarization has a size at which the light experiences the nonlinear constant $d_{33}$, and if the light travels by the angle θ around the circumference of the semicircle, the size of the angle is $d_{33}$ sin θ. The incident light alternately propagates in the semicircular waveguides, and thus, the magnitude of the nonlinear constant $d_{33}$ experienced by the light changes periodically (graph in FIG. 2), and if the light successively propagates in the semicircular waveguides, the light propagates in a first-order periodic polarization inversion structure.

Consequently, if the radius r is appropriately set, it is possible to obtain a periodic polarization inversion structure in which a quasi-phase matching condition is satisfied to achieve highly efficient wavelength conversion. Furthermore, in a method of applying electric fields, it is necessary to apply a voltage of a kV order to the LN substrate. According to the present embodiment, an effect of polarization inversion can be obtained by the waveguide structure without a step of forming a polarization inversion structure by applying an electric field, and thus, a process of manufacturing the wavelength conversion element can be simplified. Furthermore, there is an advantage in that, even in a second-order nonlinear optical crystal in which the polarization inversion structure cannot be formed by applying an electric field due to a large coercive electric field, quasi-phase matching is achieved by utilizing a large nonlinear constant without applying an electric field.

Note that, in the waveguide structure illustrated in FIG. 1, linear waveguides are provided at the incident side and the emission side. However, in a waveguide structure for practical use in which hundreds of semicircular waveguides are connected, the linear waveguides are extremely short relatively, and thus, provide little influence on the efficiency of the entire wavelength conversion.

Figure 3:
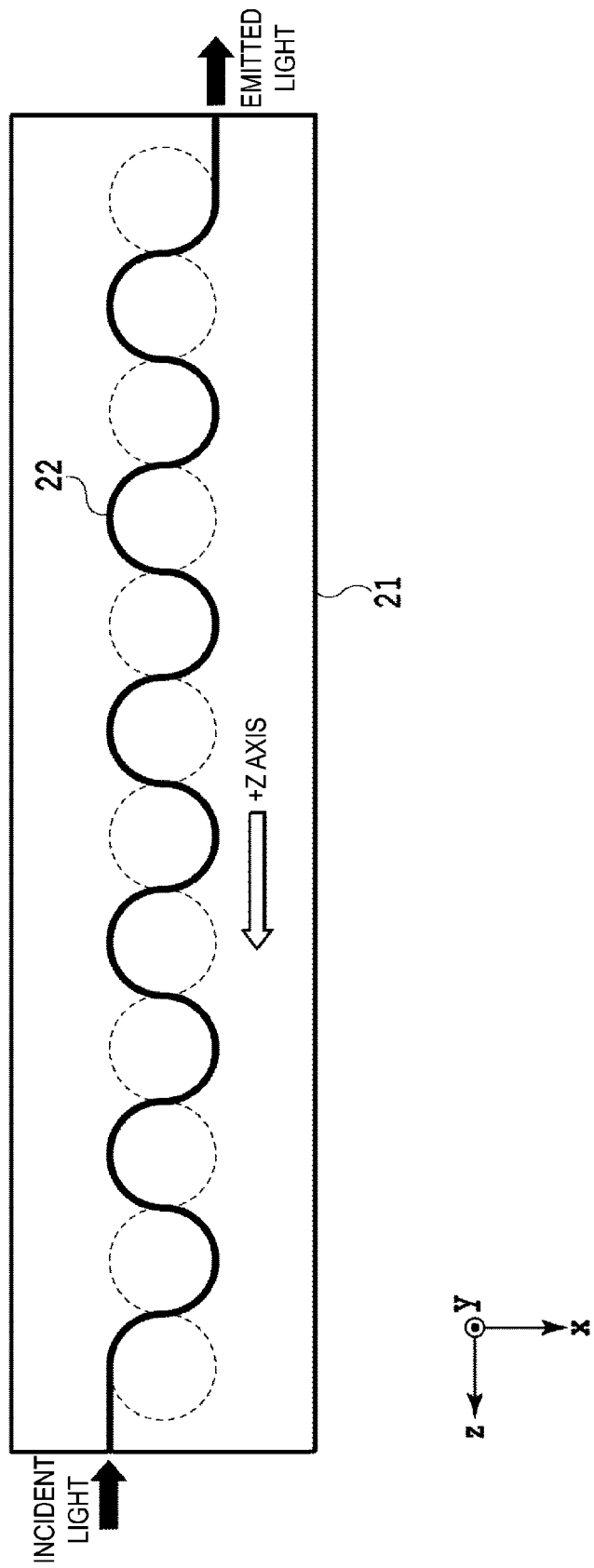
FIG. 3 is a diagram illustrating a first modification of a waveguide structure of a wavelength conversion element.

FIG. 3 illustrates a first modification of a waveguide structure of a wavelength conversion element. A waveguide 22 formed in a nonlinear optical crystal substrate 21 of a wavelength conversion element is illustrated. The +z direction of spontaneous polarization is opposite to that of the wavelength conversion element illustrated in FIG. 1.

Figure 4:
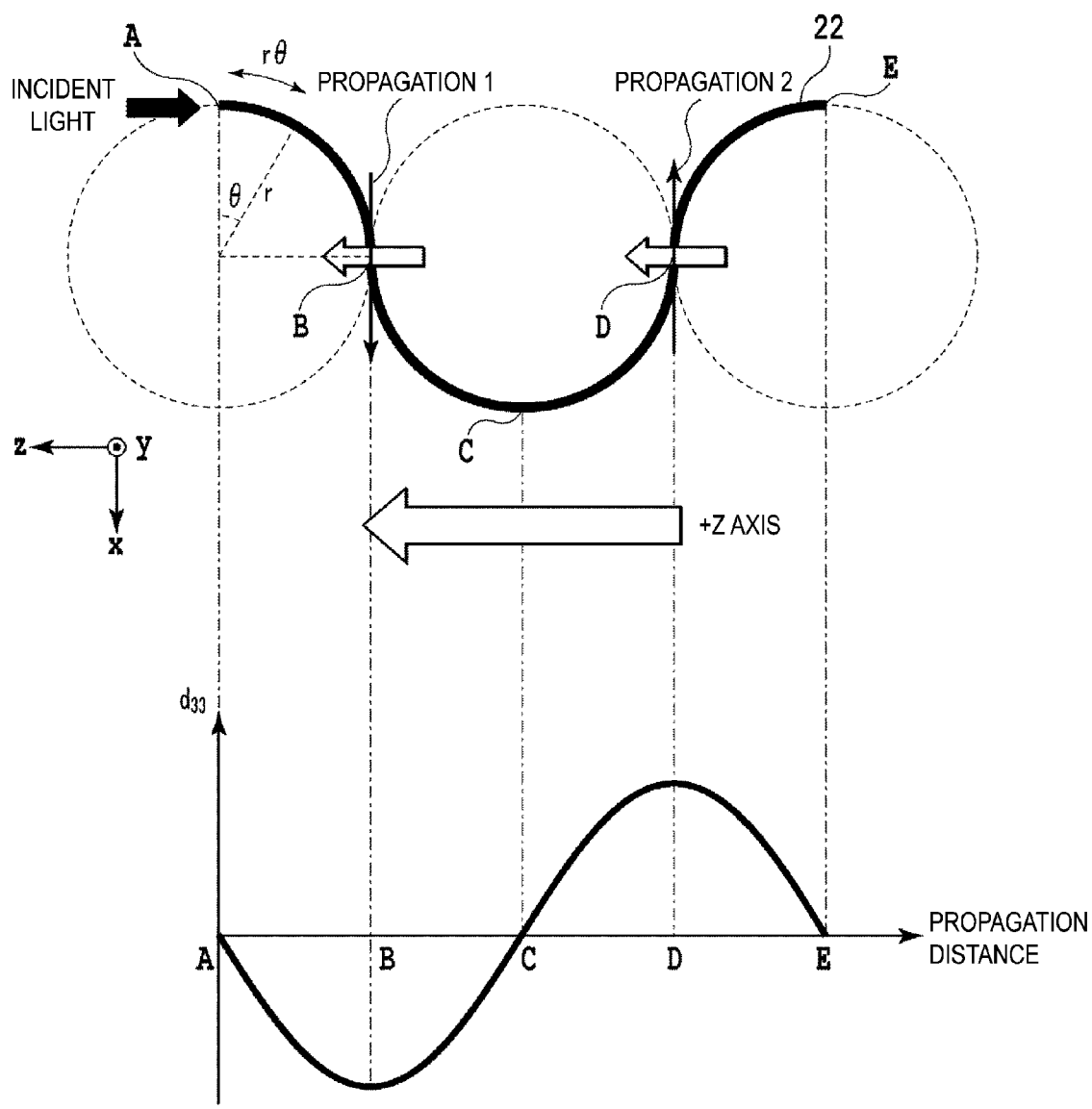
FIG. 4 is a diagram illustrating details of the waveguide structure according to the first modification.

FIG. 4 illustrates details of the waveguide structure according to the first modification. A relationship between $d_{33}$ and a propagation distance corresponding to each of points A, B, C, D, and E in the waveguide 22 is shown. At the points A, C, and E, the electric field of light oscillates in a direction perpendicular to a direction in which the polarization is directed, and nonlinearity is not exhibited. At the point B, the polarization direction is from left to right with respect to the traveling direction of the light, and at the point D, the polarization direction is from right to left with respect to the traveling direction of the light, and thus, at the points B and D, the polarization is opposite to the traveling direction of the light. The relationship between the propagation distance and $d_{33}$ is opposite to that in the graph shown in FIG. 2, but overall, a structure in which a waveguide structure similar to the one in FIG. 1 is shifted by a period 1L is obtained. Consequently, a first-order periodic polarization inversion structure satisfying a quasi-phase matching condition is obtained, and thus, highly efficient wavelength conversion is possible and an operation and effect similar to the wavelength conversion element illustrated in FIG. 1 can be obtained.

Figure 5:
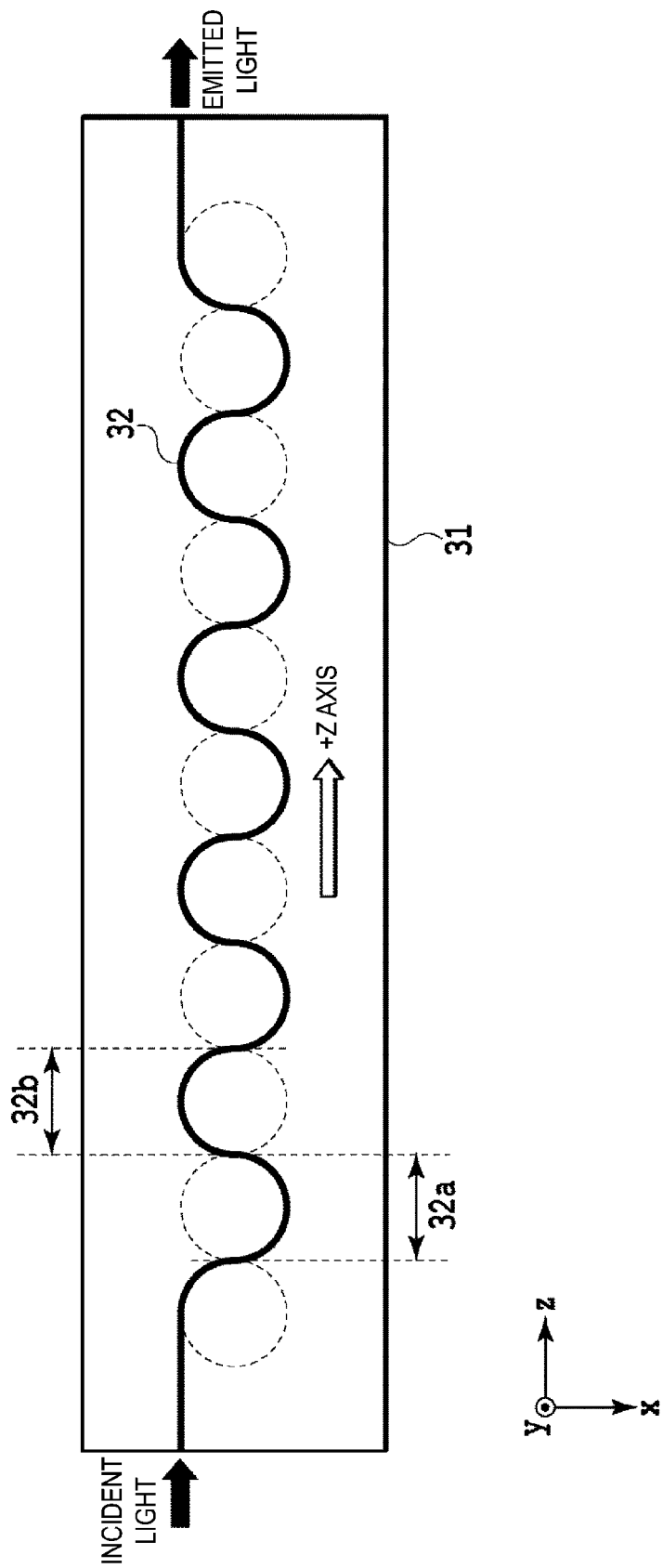
FIG. 5 is a diagram illustrating a second modification of a waveguide structure of a wavelength conversion element.

FIG. 5 illustrates a second modification of a waveguide structure of a wavelength conversion element. The arrangement of the linear waveguide at an output side where the emitted light is output is different from that of the wavelength conversion element in FIG. 1. The number of lower semicircular waveguides 32a is greater by 1 than the number of upper semicircular waveguides 32b in the drawing.

Figure 6:
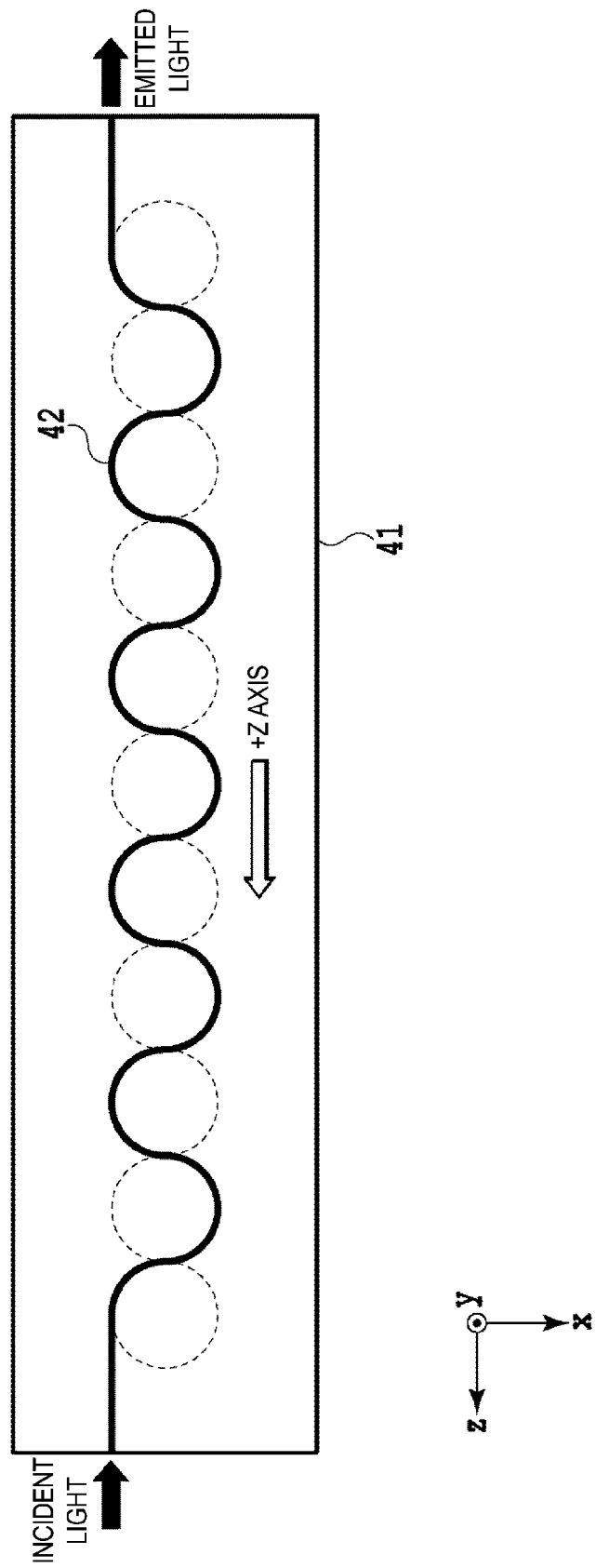
FIG. 6 is a diagram illustrating a third modification of a waveguide structure of a wavelength conversion element.

FIG. 6 illustrates a third modification of a waveguide structure of a wavelength conversion element. The +z direction of spontaneous polarization is opposite to that of the wavelength conversion element illustrated in FIG. 5. The arrangement of the linear waveguide at the output side where the emitted light is output is different from that of the wavelength conversion element in FIG. 2. Also in the second and third modifications, in a waveguide structure for practical use in which hundreds of semicircular waveguides are connected, the linear waveguides are extremely short relatively, and thus, provide little influence on the efficiency of the entire wavelength conversion.

Figure 7:
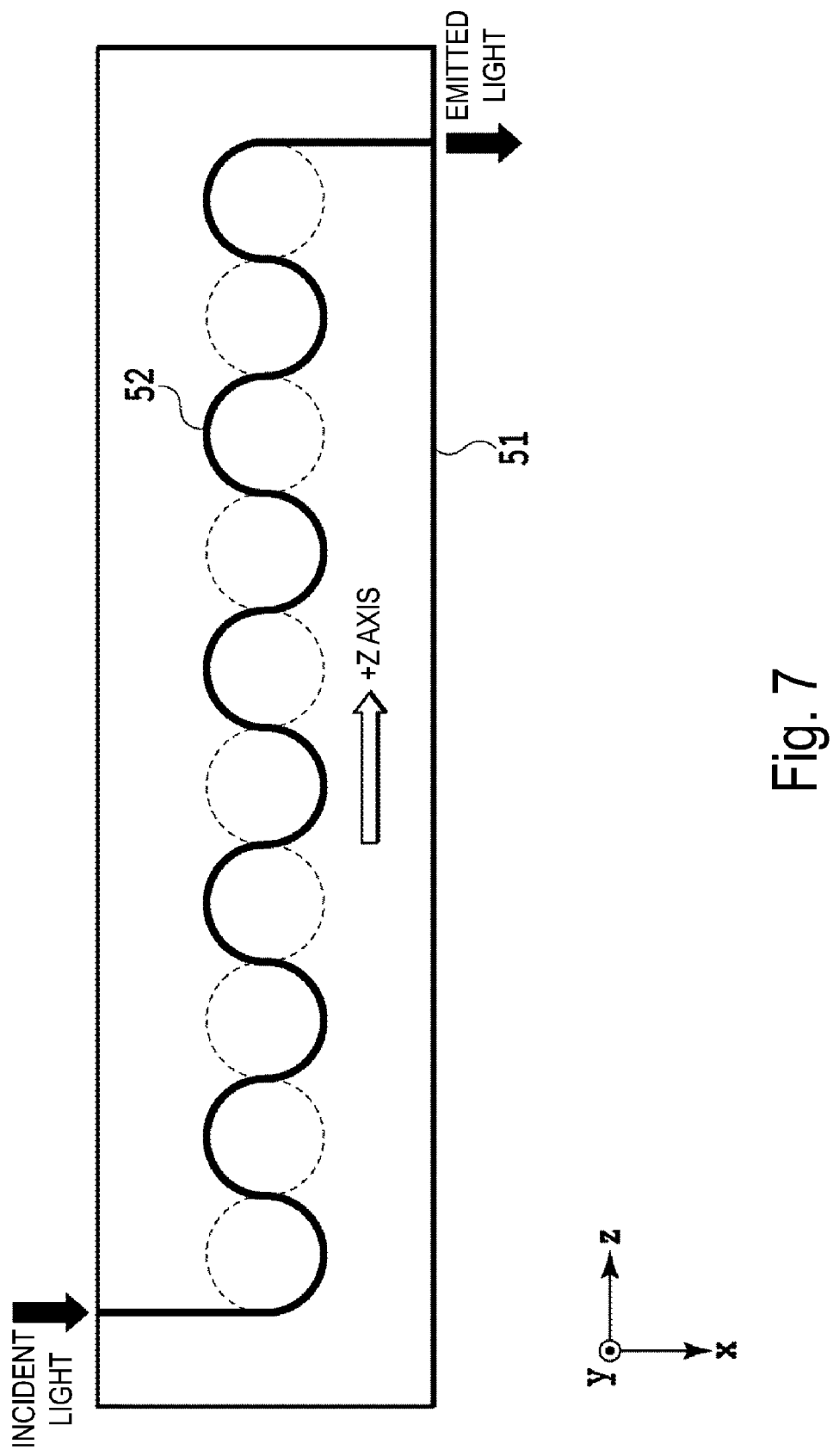
FIG. 7 is a diagram illustrating a fourth modification of a waveguide structure of a wavelength conversion element.

FIG. 7 illustrates a fourth modification of a waveguide structure of a wavelength conversion element. The arrangement of the linear waveguides on both the incident side and the output side is different from that of the wavelength conversion element in FIG. 1. The structure in which the incident light periodically experiences the nonlinear constant $d_{33}$ is the same, but the arrangement of the linear waveguides on both the incident side and the output side is different from that of the wavelength conversion element in FIG. 1, and the linear waveguides are each arranged parallel to the x-axis direction.

Figure 8:
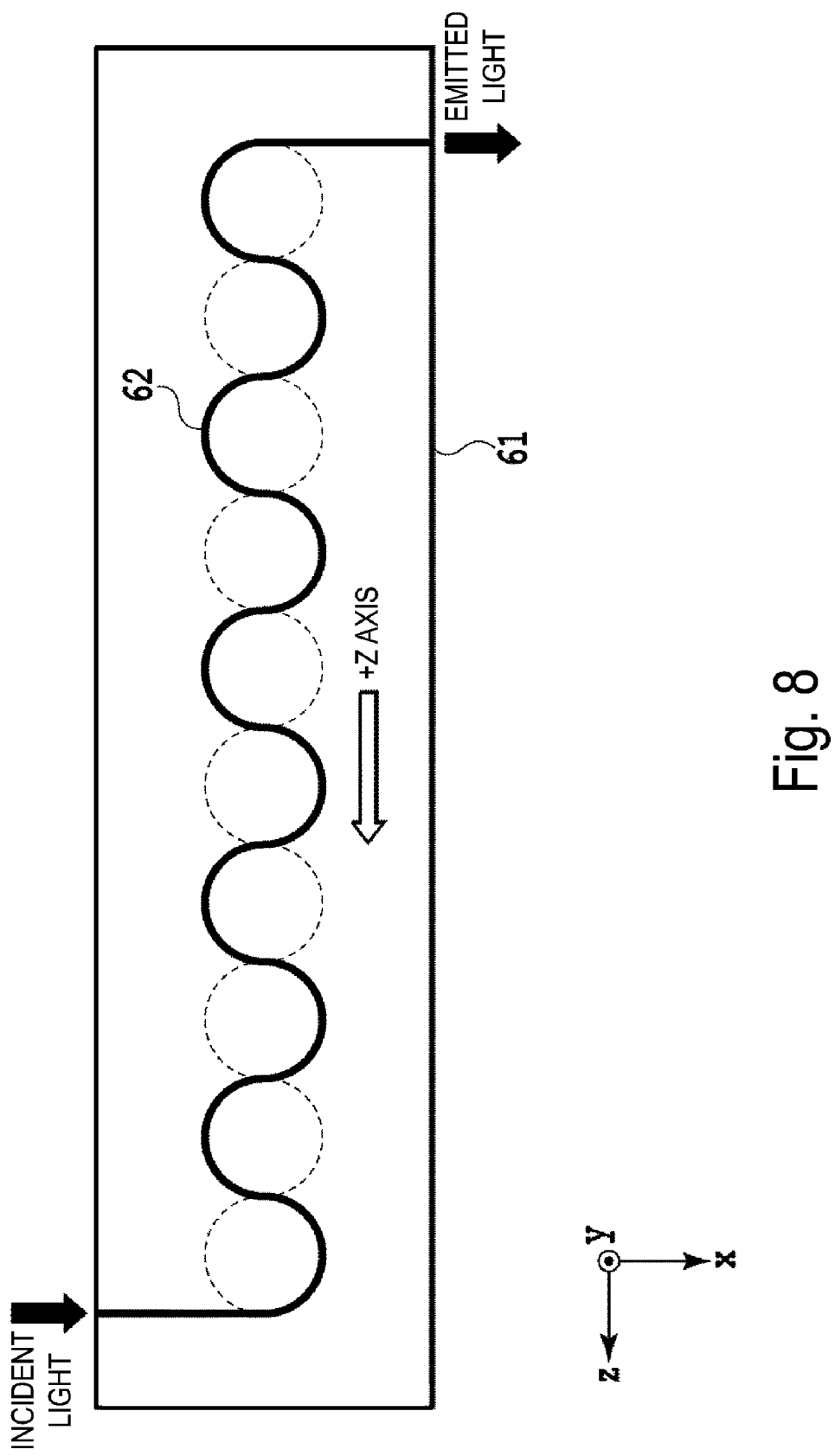
FIG. 8 is a diagram illustrating a fifth modification of a waveguide structure of a wavelength conversion element.

FIG. 8 illustrates a fifth modification of a waveguide structure of a wavelength conversion element. The +z direction of spontaneous polarization is opposite to that of the wavelength conversion element illustrated in FIG. 7. The arrangement of the linear waveguides on both the incident side and the output side is different from that of the wavelength conversion element in FIG. 2. Also in the fourth and fifth modifications, in a waveguide structure for practical use in which hundreds of semicircular waveguides are connected, the linear waveguides are extremely short relatively, and thus, provide little influence on the efficiency of the entire wavelength conversion.

Figure 9:
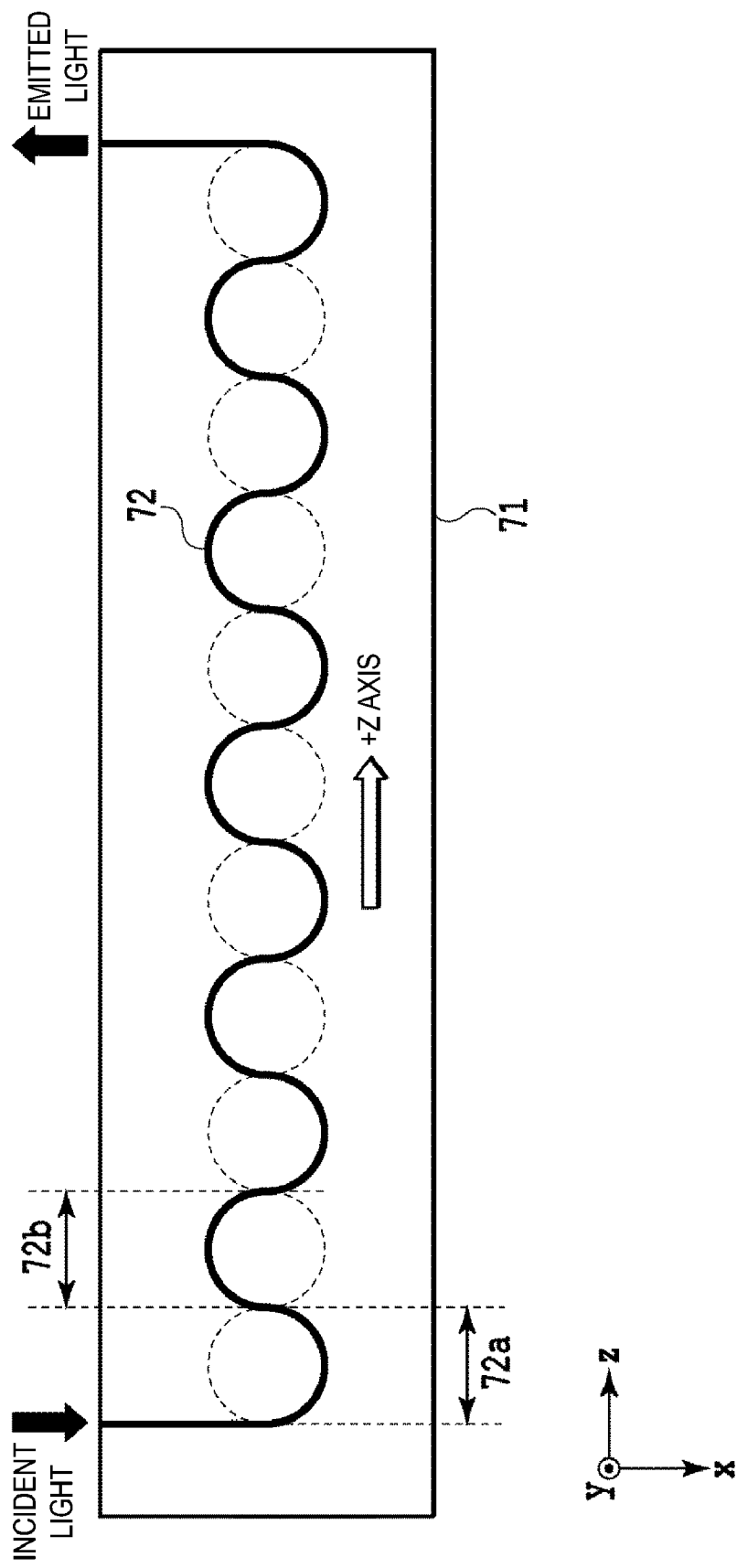
FIG. 9 is a diagram illustrating a sixth modification of a waveguide structure of a wavelength conversion element.

FIG. 9 illustrates a sixth modification of a waveguide structure of a wavelength conversion element. The arrangement of the linear waveguides on both the incident side and the output side is different from that of the wavelength conversion element in FIG. 1. The structure in which the incident light periodically experiences the nonlinear constant $d_{33}$ is the same, but the arrangement of the linear waveguides on both the incident side and the output side is different from that of the wavelength conversion element in FIG. 1, and the linear waveguides are each arranged parallel to the x-axis direction. Furthermore, the number of lower semicircular waveguides 72a is greater by 1 than the number of upper semicircular waveguides 72b in the drawing.

Figure 10:
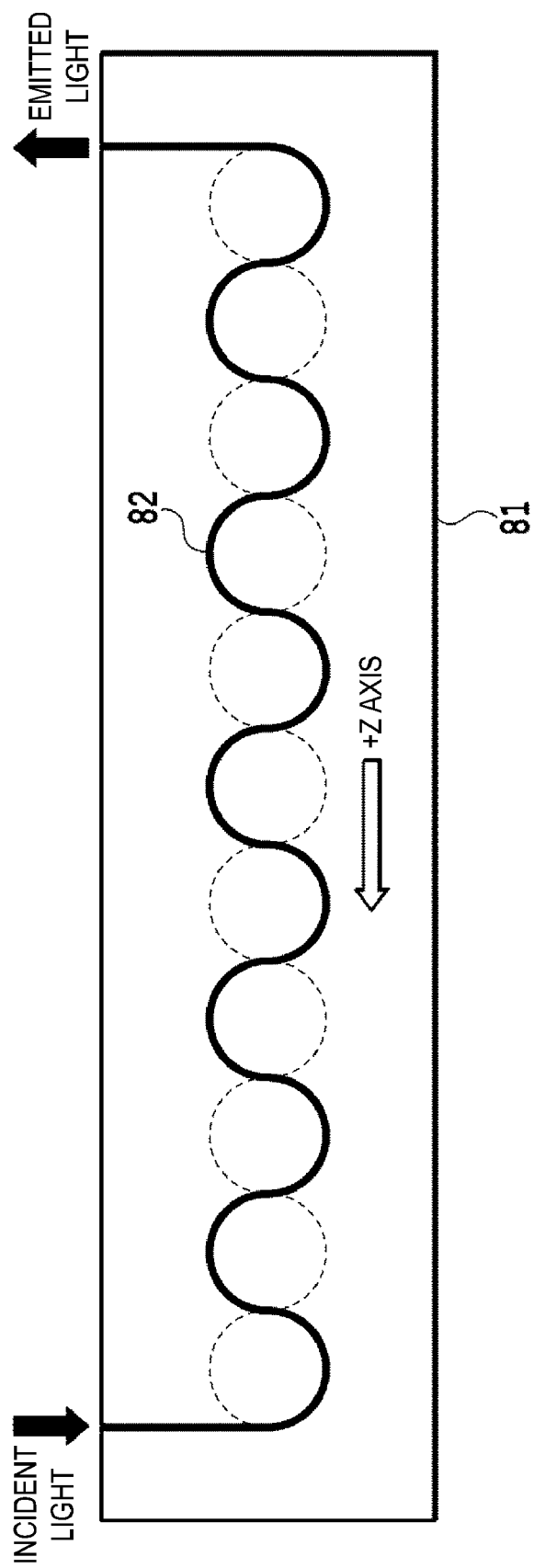
FIG. 10 is a diagram illustrating a seventh modification of a waveguide structure of a wavelength conversion element.

FIG. 10 illustrates a seventh modification of a waveguide structure of a wavelength conversion element. The +z direction of spontaneous polarization is opposite to that of the wavelength conversion element illustrated in FIG. 9. The arrangement of the linear waveguides on both the incident side and the output side is different from that of the wavelength conversion element in FIG. 2. Also in the sixth and seventh modifications, in a waveguide structure for practical use in which hundreds of semicircular waveguides are connected, the linear waveguides are extremely short relatively, and thus, provide little influence on the efficiency of the entire wavelength conversion.

In a known waveguide having a structure in which the polarization is periodically inverted, the nonlinear constant only takes the values $d_{33}$ or $-d_{33}$, and thus, if the structure is described by a Fourier series expansion of a rectangular wave, the structure can be described by a superposition of sine waves having an odd-numbered order such as first order, third order, and fifth order. That is, quasi-phase matching of a higher order such as third order or fifth order occurs. Higher order quasi-phase matching is parasitized to generate wavelength conversion, the converted light obtained by the wavelength conversion is further converted, and unintended wavelength-converted light is generated.

However, according to the waveguide structure of the wavelength conversion element according to the present embodiment, when light propagates in the semicircular waveguides, as illustrated in FIG. 2, only first order quasi-phase matching occurs. Consequently, there is an advantage in that higher order quasi-phase matching does not occur, and thus, the influence of unintended wavelength conversion is reduced.

In the present embodiment, a plurality of circles are arranged in the +z direction of spontaneous polarization, and at the points B and D illustrated in FIG. 2, the waveguide intersects perpendicular to the z axis. When the angle of the waveguide with respect to the z-axis has an error of 5 degrees, the light intensity is reduced by about 1%. Consequently, an error of about ±5 degrees is allowable in the manufacturing of the waveguide.

Examples

FIG. 11 illustrates a method of manufacturing the wavelength conversion element according to the present embodiment. For example, the method described in NPLs 1 and 2 can be applied. An x-cut lithium tantalate substrate is employed for a lower substrate (support substrate) 91, and an x-cut lithium niobate (LN) substrate is employed for an upper substrate 92 (FIG. 11(a)). The z-axis direction of the two substrates is aligned to directly bond the two substrates (FIG. 11 (b)), and subsequently, the LN of the upper substrate 92 is thinned to form a thin film of 5 μm (FIG. 11(c)). The LN of the upper substrate 92 has a higher refractive index than the lower substrate 91 and serves as a core layer of the waveguide.

Subsequently, the core layer is etched by a photo process to produce, on the upper substrate 92, a plurality of the waveguide structures in which the semicircular waveguides of the present embodiment are connected (FIG. 11(d)). The waveguide structure included a ridge-type waveguide having a core width of 5.5 μm and a core height of 5.0 μm so to obtain a waveguide structure of single mode in a 1.55 μm band. In the present example, visible light was obtained through SHG from the incident light in the 1.55 μm band, and among the phase matching conditions mentioned above, the inversion period Λ, that is, the path length ($2\pi r$) of two semicircular waveguides was set to 15.5 μm. The arrangement of the linear waveguides on both the incident side and the output side is the same as that of the wavelength conversion element in FIG. 1. The produced waveguide structures are each cut out and a non-reflective coating is applied to end surfaces of the waveguide at the incident side and the emission side (FIG. 11(e)).

The linear waveguide at the incident side and a tunable wavelength laser of the 1.55 μm band are optically bonded so that incident light having a wavelength of 1.52 μm enters as TE-polarized light. An Si receiver is optically bonded to the linear waveguide at the emission side to measure emitted light. When incident light having a wavelength of 1.52 μm and 1 mW entered, an output of visible light having a wavelength of 0.76 μm and 25 μW obtained through SHG was measured. The efficiency of the wavelength conversion element in the present example was 2500%/W.

In the present embodiment, LN was described in an example, but a similar effect can be obtained with doped lithium niobate containing at least one of Mg, Zn, Sc, or In as an additive. Furthermore, a suitable lower substrate is employed, and another second-order nonlinear optical crystal having $d_{33}$, such as lithium tantalate, may be employed.

When the wavelength of incident light is short, the radius of the semicircular waveguide decreases, but a structure may be adopted in which the path length is appropriately set and an offset is provided on the way of the curved waveguide to reduce a radiation loss.

The shapes of the structure of the waveguides at the incident side and the emission side are illustrated in the present embodiment in an example. However, any other shape may be employed as long as the shapes have little influence on the effect of the wavelength conversion portion satisfying the quasi-phase matching condition.

In the present example, lithium tantalate was employed for the lower substrate. However, lithium niobate with an adhesive interposed may be employed, or an insulator material as described in NPL 4 may be employed. Furthermore, in the present example, an X-cut substrate was used. However, a Y-cut substrate may be used as long as the Z-axis is within the substrate plane.

The invention claimed is:

1. A wavelength conversion element being formed of a second-order nonlinear optical crystal and having a z-axis, running along a direction of spontaneous polarization, within a substrate plane, the wavelength conversion element comprising:
 a waveguide in which, when a plurality of circles having centers on a straight line parallel to the z-axis and having an identical radius are depicted so that circumferences of the plurality of circles contact each other, semicircular waveguides corresponding to one semicircles of the circumferences with the straight line as a boundary, are alternately connected.

2. The wavelength conversion element according to claim 1, wherein the waveguide is a ridge-type waveguide formed by etching a core layer formed into a thin film on a support substrate.

3. The wavelength conversion element according to claim 2, wherein the second-order nonlinear optical crystal is $LiNbO_3$, or $LiNbO_3$ containing at least one of Mg, Zn, Sc, or In as an additive.

4. The wavelength conversion element according to claim 1, wherein the second-order nonlinear optical crystal is $LiNbO_3$, or $LiNbO_3$ containing at least one of Mg, Zn, Sc, or In as an additive.

* * * * *